US012735053B2

(12) United States Patent
Shahriari et al.

(10) Patent No.: US 12,735,053 B2
(45) Date of Patent: Sep. 15, 2026

(54) MANEUVER PREDICTION BASED SPEED PROFILE ADAPTATION FOR BEHAVIOR BASED AUTOMATED CRUISE CONTROL

(71) Applicant: GM Global Technology Operations LLC, Detroit, MI (US)

(72) Inventors: Mohammadali Shahriari, Markham (CA); Kevin A. O'Dea, Ann Arbor, MI (US); Ashraf Abualfellat, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 19/033,862

(22) Filed: Jan. 22, 2025

(65) Prior Publication Data

US 2026/0208746 A1 Jul. 23, 2026

(51) Int. Cl.
*B60W 50/00* (2006.01)
*B60W 10/06* (2006.01)
(Continued)

(52) U.S. Cl.
CPC ........ *B60W 50/0097* (2013.01); *B60W 10/06* (2013.01); *B60W 10/10* (2013.01);
(Continued)

(58) Field of Classification Search
CPC .. B60W 50/0097; B60W 10/06; B60W 10/10; B60W 10/18; B60W 30/143; B60W 60/001; B60W 50/023; B60W 2050/0022; B60W 2050/0052; B60W 2520/10; B60W 2520/12; B60W 2520/14; B60W 2540/10; B60W 2540/12; B60W 2540/18; B60W 2552/05; B60W 2552/10; B60W 2556/10; B60W 2556/50; B60W 2710/06;
(Continued)

(56) References Cited

U.S. PATENT DOCUMENTS

2023/0103248 A1* 3/2023 Abrash ................ B60W 10/18 701/26
2024/0409090 A1* 12/2024 Abroshan .......... B60W 60/0011
2026/0054737 A1* 2/2026 Liu .................. B60W 50/0097

FOREIGN PATENT DOCUMENTS

| | | | |
|---|---|---|---|
| DE | 102005043838 | A1 | 3/2007 |
| DE | 102023128248 | A1 | 12/2024 |
| EP | 3752401 | B1 | 6/2023 |

* cited by examiner

*Primary Examiner* — Sihar A Karwan
(74) *Attorney, Agent, or Firm* — Vivacqua Crane, PLLC

(57) ABSTRACT

A system for maneuver prediction based speed profile adaptation for behavior based automated cruise control in a host vehicle includes sensors and actuators in communication with a controller. The controller executing a maneuver prediction speed profile adaptation (MPSPA) application that captures static and dynamic information about the host vehicle and about the host vehicle's environment. The MPSA application processes sensor information and performs: feature extraction, synchronization, normalization, generates a probabilistic path prediction, and detects an intent of a vehicle operator. The MPSA Application generates a control command to the actuators to selectively alter at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

14 Claims, 4 Drawing Sheets

(51) Int. Cl.

| | |
|---|---|
| ***B60W 10/10*** | (2012.01) |
| ***B60W 10/18*** | (2012.01) |
| ***B60W 30/14*** | (2006.01) |
| ***B60W 60/00*** | (2020.01) |
| ***G05B 13/02*** | (2006.01) |
| *B60W 50/023* | (2012.01) |

(52) U.S. Cl.

CPC .......... *B60W 10/18* (2013.01); *B60W 30/143* (2013.01); *B60W 60/001* (2020.02); *G05B 13/0265* (2013.01); *B60W 2050/0022* (2013.01); *B60W 2050/0052* (2013.01); *B60W 50/023* (2013.01); *B60W 2520/10* (2013.01); *B60W 2520/12* (2013.01); *B60W 2520/14* (2013.01); *B60W 2540/10* (2013.01); *B60W 2540/12* (2013.01); *B60W 2540/18* (2013.01); *B60W 2552/05* (2020.02); *B60W 2552/10* (2020.02); *B60W 2556/10* (2020.02); *B60W 2556/50* (2020.02); *B60W 2710/06* (2013.01); *B60W 2710/10* (2013.01); *B60W 2710/18* (2013.01); *B60W 2720/10* (2013.01)

(58) Field of Classification Search

CPC ......... B60W 2710/10; B60W 2710/18; B60W 2720/10; G05B 13/0265

See application file for complete search history.

MANEUVER PREDICTION BASED SPEED PROFILE ADAPTATION FOR BEHAVIOR BASED AUTOMATED CRUISE CONTROL

INTRODUCTION

The present disclosure relates to cruise control systems in vehicles, and more specifically to advanced driver assistance systems executing cruise control functions in vehicles.

Vehicles equipped with advanced driver assistance systems (ADAS) use a plurality of sensors to detect vehicle surroundings, and actuators to adjust vehicle performance in relation to the vehicle's surroundings, including through the use of adaptive cruise control (ACC) functionality.

While current systems and methods of ADAS-based ACC achieve their intended purpose, there is a need for a new and improved system and method for ADAS-based ACC that incorporates maneuver prediction and speed adaptation to ensure that vehicle performance using ADAS and ACC adaptively adjusts to vehicle operator or driver input preferences, thereby increasing vehicle operator comfort, while maintaining ADAS and ACC efficiency, improving accuracy and responsiveness of the ACC, leading to smoother and more intelligent driving experiences while maintaining or decreasing system complexity, and increasing redundancy.

SUMMARY

According to several aspects, a system for maneuver prediction based speed profile adaptation for behavior based automated cruise control in a host vehicle includes: a host vehicle, one or more sensors and one or more actuators. The one or more sensors detect static and dynamic state information about the host vehicle, and the one or more actuators alter static and dynamic performance of the host vehicle. The system further includes a controller having a processor, a memory, and input/output (I/O) ports. The I/O ports are in communication with the one or more sensors and the one or more actuators. The processor executes program code portions stored in the memory. The program code portions include a maneuver prediction speed profile adaptation (MPSPA) application having at least first, second, third, and fourth control logics. The first control logic captures static and dynamic information about the host vehicle and about an environment surrounding the host vehicle. The second control logic processes the static and dynamic information about the host vehicle and about the environment surrounding the host vehicle. The processing includes at least: feature extraction, synchronization, normalization, and generating a probabilistic path prediction. The third control logic detects an intent of a vehicle operator. The fourth control logic generates a control command to the one or more actuators. The control command selectively alters at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

In another aspect of the present disclosure the first control logic further includes control logic for obtaining host vehicle position, movement, and acceleration information in at least three degrees of freedom from an inertial measurement unit (IMU). The first control logic further includes control logic for obtaining a host vehicle steering angle from one or more steering angle sensors (SAS), control logic for obtaining an accelerator pedal position from an accelerator pedal position sensor; and control logic for obtaining a brake pedal position from a brake pedal position sensor.

In another aspect of the present disclosure, the second control logic further includes control logic for filtering and performing feature extraction on data from the one or more sensors. Filtering causes the system and MPSPA application to reduce computational resource utilization from a first level to a second level less than the first by selecting only certain portions of the data from the one or more sensors that may indicate a host vehicle state change. The feature extraction further determines that the host vehicle state change is of a magnitude calling for additional processing.

In another aspect of the present disclosure, the second control logic further includes control logic for synchronizing the data from the one or more sensors. Synchronizing the data causes the data from the one or more sensors to be accurately aligned and associated in time, so that data from each of the one or more sensors is correlated in time with data from each of the other sensors of the one or more sensors.

In another aspect of the present disclosure, the second control logic further includes control logic for generating a probabilistic path prediction utilizing a probability function for each state variable, following a sigmoid function where: host vehicle state variables include: host vehicle speed, $v_x$, host vehicle steering angle $\delta$, torsion bar torque, $\tau$, and torsion bar torque rate, $\dot{\tau}$, and $$P_{M,x}(k) = \frac{1}{1 + e^{-\beta_{M,x}(|x| - \backslash\alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following. A maneuver probability is obtained by multiplication of state probability functions as follows:

$$P_M(k) = g_d \prod_{x=1}^{n} [\![ P_{M,x}(k ]\!]) \quad \text{Eq. 2}$$

where $P_{M,x}$: is a probability function of variable x for maneuver M; k is a sampling time, $\beta_{M,x}$ is a tuning parameter, sigmoid steepness of variable x for maneuver M; $\alpha_{M,x}$ is a tuning parameter, sigmoid midpoint of variable x for maneuver M; n is a number or quantity of variables; and $g_d$ is a direction of the maneuver M such that for a right side maneuver is $g_d=-1$, and for a left side maneuver $g_d=1$.

In another aspect of the present disclosure, the second control logic further includes control logic for integrating environmental knowledge in environmental knowledge categories including: road information, road type, a number or quantity of lanes, construction zone presence/absence, surrounding object information, closest-in-vehicle path (CIPV) turn signals, and navigation information. An effect of each environmental knowledge category is represented by a gain where a multiplication of all environmental knowledge category gains defines a final environmental gain, which is expressed as:

$$g_{M,e} = g_{M,r} \times g_{M,s} \times g_{M,n} \quad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M. The following equation expresses a maneuver probability function considering environmental knowledge:

$$P_M(k) = g_{M,e} \times g_d \prod_{x=1}^{n} [\![P_{M,x}(k)]\!]. \quad \text{Eq. 4}$$

In another aspect of the present disclosure, the second control logic further includes control logic for normalizing the sensor data. Normalizing the sensor data reduces redundant information in sensor data from a first redundancy level to a second redundancy level less than the first redundancy level. The second control logic further includes control logic for generating a confidence calculation. An output of the confidence calculation defines a likelihood that a particular type of maneuver M is being carried out by the host vehicle.

In another aspect of the present disclosure, the third control logic further includes control logic for utilizing a data driven classification machine-learning (ML) model to incorporate a shadow planner that enhances adaptive cruise control (ACC) by predicting the vehicle operator's intended path and adapting a speed profile of the host vehicle to match the vehicle operator's intent based on an analysis of vehicle operator inputs to host vehicle control systems and behavior of surrounding vehicles. The third control logic further includes control logic for performing real-time path classification to assess the type of maneuver that the vehicle operator and ADAS of the host vehicle are actively pursuing, and control logic for performing an enumeration calculation that qualifies classified real-time paths as defining at least one of: a left turn and a right turn.

In another aspect of the present disclosure, the third control logic further includes control logic for generating a trajectory prediction based on real-time paths, global positioning system (GPS) data and navigation information, including a chosen navigation route.

In another aspect of the present disclosure, the fourth control logic further includes control logic for generating a control command to the one or more actuators. The control command includes a predicted lateral command and a predicted longitudinal command. The fourth control logic further includes control logic for activating and controlling one or more actuators of a host vehicle transmission control system, engine control system, and braking control system to alter at least a longitudinal velocity of the host vehicle while a current classified real-time path maneuver M is being carried out in accordance with the predicted lateral command and the predicted longitudinal command.

In another aspect of the present disclosure, a method for maneuver prediction based speed profile adaptation for behavior based automated cruise control in a vehicle includes detecting static and dynamic state information about a host vehicle with one or more sensors of the host vehicle, and altering static and dynamic performance of the host vehicle with one or more actuators of the host vehicle. The method further includes executing, by a processor of a controller of the host vehicle, program code portions stored in memory of the controller. The controller further includes input/output (I/O) ports in communication with the one or more sensors and the one or more actuators. The program code portions include a maneuver prediction speed profile adaptation (MPSPA) application. The MPSPA application includes control logic for capturing static and dynamic information about the host vehicle and about an environment surrounding the host vehicle, and for processing the static and dynamic information about the host vehicle and about the environment surrounding the host vehicle. The processing includes at least: feature extraction, synchronization, normalization, and generating a probabilistic path prediction. The processing further includes detecting an intent of a vehicle operator, and generating a control command to the one or more actuators. The control command selectively alters at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

In another aspect of the present disclosure, the method further includes obtaining host vehicle position, movement, and acceleration information in at least three degrees of freedom from an inertial measurement unit (IMU), obtaining a host vehicle steering angle from one or more steering angle sensors (SAS), obtaining an accelerator pedal position from an accelerator pedal position sensor, and obtaining a brake pedal position from a brake pedal position sensor.

In another aspect of the present disclosure, the method further includes filtering and performing feature extraction on data from the one or more sensors. Filtering causes the method and MPSPA application to reduce computational resource utilization from a first level to a second level less than the first by selecting only certain portions of the data from the one or more sensors that may indicate a host vehicle state change. The feature extraction further determines that the host vehicle state change is of a magnitude calling for additional processing.

In another aspect of the present disclosure, the method further includes synchronizing the data from the one or more sensors. Synchronizing the data causes the data from the one or more sensors to be accurately aligned and associated in time, so that data from each of the one or more sensors is correlated in time with data from each of the other sensors of the one or more sensors.

In another aspect of the present disclosure, the method further includes generating a probabilistic path prediction utilizing a probability function for each state variable, following a sigmoid function where: host vehicle state variables include: host vehicle speed, $v_x$, host vehicle steering angle, $\delta$, torsion bar torque, $\tau$, and torsion bar torque rate, $\dot{\tau}$.

$$P_{M,x}(k) = \frac{1}{1 + e^{-\beta_{M,x}(|x| - \alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following. A maneuver probability is obtained by multiplication of state probability functions as follows:

$$P_M(k) = g_d \prod_{x=1}^{n} [\![P_{M,x}(k)]\!] \quad \text{Eq. 2}$$

where $P_{M,x}$: is a probability function of variable x for maneuver M; k is a sampling time, $\beta_{M,x}$ is a tuning parameter, sigmoid steepness of variable x for maneuver M; $\alpha_{M,x}$ is a tuning parameter, sigmoid midpoint of variable x for maneuver M; n is a number or quantity of variables; and $g_d$ is a direction of the maneuver M such that for a right side maneuver is $g_d=-1$, and for a left side maneuver $g_d=1$.

In another aspect of the present disclosure, the method further includes integrating environmental knowledge in environmental knowledge categories including: road information, road type, a number or quantity of lanes, construction zone presence/absence, surrounding object information, closest-in-vehicle path (CIPV) turn signals, and navigation information. An effect of each environmental knowledge category is represented by a gain where a multiplication of all environmental knowledge category gains defines a final environmental gain, which is expressed as:

$$g_{M,e} = g_{M,r} \times g_{M,s} \times g_{M,n} \quad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M. The following equation expresses a maneuver probability function considering environmental knowledge:

$$P_M(k) = g_{M,e} \times g_d \prod_{x=1}^{n} [\![P_{M,x}(k)]\!]. \quad \text{Eq. 4}$$

In another aspect of the present disclosure, the method further includes normalizing the sensor data. Normalizing the sensor data reduces redundant information in sensor data from a first redundancy level to a second redundancy level less than the first redundancy level. The method further includes generating a confidence calculation. An output of the confidence calculation defines a likelihood that a particular type of maneuver M is being carried out by the host vehicle.

In another aspect of the present disclosure, the method further includes utilizing a data driven classification machine-learning (ML) model to incorporate a shadow planner that enhances adaptive cruise control (ACC) by predicting the vehicle operator's intended path and adapting a speed profile of the host vehicle to match the vehicle operator's intent based on an analysis of vehicle operator inputs to host vehicle control methods and behavior of surrounding vehicles. The method further includes performing real-time path classification to assess the type of maneuver that the vehicle operator and ADAS of the host vehicle are actively pursuing; and performing an enumeration calculation that qualifies classified real-time paths as defining at least one of: a left turn and a right turn.

In another aspect of the present disclosure, the method further includes generating a trajectory prediction based on real-time paths, global positioning method (GPS) data and navigation information, including a chosen navigation route. The method further includes generating a control command to the one or more actuators. The control command includes a predicted lateral command and a predicted longitudinal command. The method further includes activating and controlling one or more actuators of a host vehicle transmission control system, engine control system, and braking control system to alter at least a longitudinal velocity of the host vehicle while a current classified real-time path maneuver M is being carried out in accordance with the predicted lateral command and the predicted longitudinal command.

In another aspect of the present disclosure, a method for maneuver prediction based speed profile adaptation for behavior based automated cruise control in a host vehicle includes: detecting static and dynamic state information about a host vehicle with one or more sensors of the host vehicle, and altering static and dynamic performance of the host vehicle with one or more actuators of the host vehicle. The method further includes executing, by a processor of a controller of the host vehicle, program code portions stored in memory of the controller. The controller further includes input/output (I/O) ports in communication with the one or more sensors and the one or more actuators. The program code portions includes a maneuver prediction speed profile adaptation (MPSPA) application including: capturing static and dynamic information about the host vehicle and about an environment surrounding the host vehicle, including: obtaining host vehicle position, movement, and acceleration information in at least three degrees of freedom from an inertial measurement unit (IMU), obtaining a host vehicle steering angle from one or more steering angle sensors (SAS), obtaining an accelerator pedal position from an accelerator pedal position sensor; and obtaining a brake pedal position from a brake pedal position sensor. The method further includes processing the static and dynamic information about the host vehicle and about the environment surrounding the host vehicle. The processing includes at least: feature extraction, synchronization, normalization, and generating a probabilistic path prediction, including: filtering and performing feature extraction on data from the one or more sensors. Filtering causes the method and MPSPA application to reduce computational resource utilization from a first level to a second level less than the first by selecting only certain portions of the data from the one or more sensors that may indicate a host vehicle state change. The feature extraction further determines that the host vehicle state change is of a magnitude calling for additional processing; synchronizing the data from the one or more sensors. Synchronizing the data causes the data from the one or more sensors to be accurately aligned and associated in time, so that data from each of the one or more sensors is correlated in time with data from each of the other sensors of the one or more sensors. The method further includes generating a probabilistic path prediction utilizing a probability function for each state variable, following a sigmoid function where: host vehicle state variables include: host vehicle speed, $v_x$, host vehicle steering angle, $\delta$, torsion bar torque, $\tau$, and torsion bar torque rate, $\dot{\tau}$, $$P_{M,x}(k) = \frac{1}{1 + e^{-\beta_{M,x}(|x| - \alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following. A maneuver probability is obtained by multiplication of state probability functions as follows:

$$P_M(k) = g_d \prod_{x=1}^{n} [\![P_{M,x}(k)]\!] \quad \text{Eq. 2}$$

where $P_{M,x}$: is a probability function of variable x for maneuver M; k is a sampling time, $\beta_{M,x}$ is a tuning parameter, sigmoid steepness of variable x for maneuver M; $\alpha_{M,x}$ is a tuning parameter, sigmoid midpoint of variable x for maneuver M; n is a number or quantity of variables; and $g_d$ is a direction of the maneuver M such that for a right side maneuver is $g_d$=−1, and for a left side maneuver $g_d$=1. The method further includes integrating environmental knowledge in environmental knowledge categories including: road information, road type, a number or quantity of lanes, construction zone presence/absence, surrounding object information, closest-in-vehicle path (CIPV) turn signals, and navigation information. An effect of each environmental knowledge category is represented by a gain where a multiplication of all environmental knowledge category gains defines a final environmental gain, which is expressed as:

$$g_{M,e} = g_{M,r} \times g_{M,s} \times g_{M,n} \quad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M. The following equation expresses a maneuver probability function considering environmental knowledge:

$$P_M(k) = g_{M,e} \times g_d \prod_{x=1}^{n} [\![P_{M,x}(k)]\!]. \quad \text{Eq. 4}$$

The method further includes normalizing the sensor data, wherein normalizing the sensor data reduces redundant information in sensor data from a first redundancy level to a second redundancy level less than the first redundancy level, and generating a confidence calculation. An output of the confidence calculation defines a likelihood that a particular type of maneuver M is being carried out by the host vehicle. The method further includes detecting an intent of a vehicle operator, including: utilizing a data driven classification machine-learning (ML) model to incorporate a shadow planner that enhances adaptive cruise control (ACC) by predicting the vehicle operator's intended path and adapting a speed profile of the host vehicle to match the vehicle operator's intent based on an analysis of vehicle operator inputs to host vehicle control methods and behavior of surrounding vehicles. The method further includes performing real-time path classification to assess the type of maneuver that the vehicle operator and ADAS of the host vehicle are actively pursuing; and performing an enumeration calculation that qualifies classified real-time paths as defining at least one of: a left turn and a right turn. The method further includes generating a trajectory prediction based on the real-time paths, global positioning method (GPS) data and navigation information, including a chosen navigation route; and generating a control command to the one or more actuators. The control command includes a predicted lateral command and a predicted longitudinal command. The method further includes activating and controlling one or more actuators of a host vehicle transmission control system, engine control system, and braking control system to alter at least a longitudinal velocity of the host vehicle while a current classified real-time path maneuver M is being carried out in accordance with the predicted lateral command and the predicted longitudinal command. The control command selectively alters at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
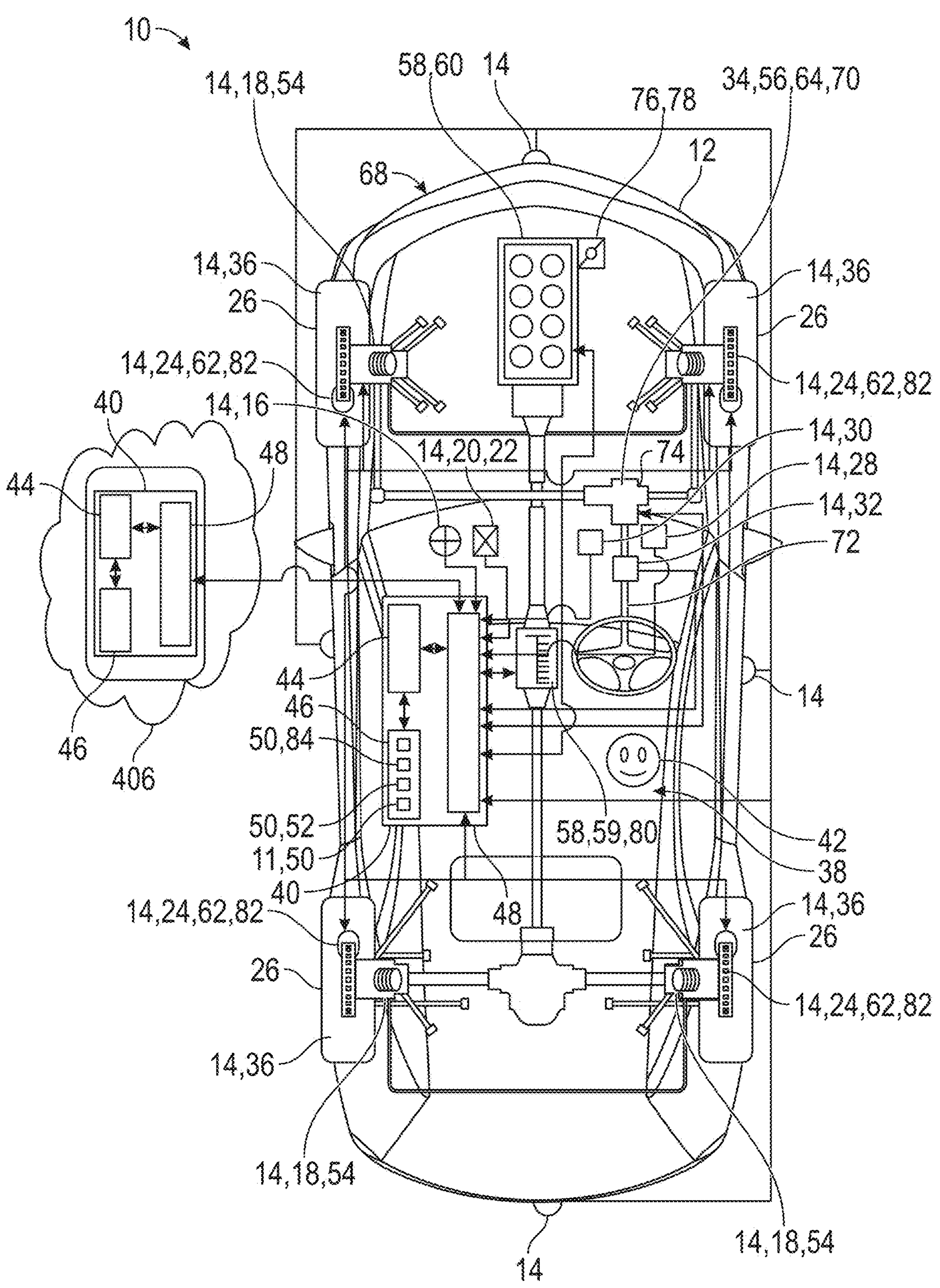
FIG. 1 is a schematic diagram of a system for maneuver prediction based speed profile adaptation for behavior based automated cruise control according to an aspect of the present disclosure.

Referring to FIG. 1, a system 10 for maneuver prediction-based speed profile adaptation for behavior-based automated cruise control (ACC) 11 is shown. The system 10 includes a vehicle 12. The host vehicle 12 is illustrated as a passenger vehicle, however, it should be appreciated that the host vehicle 12 may be any type of vehicle, including but not limited to: cars, trucks, sport utility vehicles (SUVs), vans, motor homes, semis, tractor-trailers, delivery vehicles including vehicles used within warehouses, tricycles, motorcycles, planes, amphibious vehicles, or any other such vehicle 12. Additionally, the host vehicle 12 may be an aircraft, a watercraft, or the like without departing from the scope or intent of the present disclosure.

The system 10 further includes one or more sensors 14 disposed on, attached to, or otherwise integrated into the host vehicle 12. Additional sensors 14 may be located remotely from the host vehicle 12, and communicate information to the host vehicle 12 as will be described in further detail below. Sensors 14 of the host vehicle 12 may include any of a wide variety of sensor types, including but not limited to: electromagnetic (EM) sensors 14 such as cameras, infra-red cameras, video cameras, light detection and ranging (LiDAR) sensors, radio detection and ranging (RADAR) sensors, sound navigation and ranging (SONAR) sensors, and the like. In some examples, cameras and/or other sensors 14 of the host vehicle 12 are mounted with exterior fields of view (FOVs), and data collected by such cameras include optical information about an environment in which the host vehicle 12 is operating. In additional non-limiting examples, the cameras and/or other sensors 14 are directed towards an interior or passenger compartment of the host vehicle 12, thereby providing information about host vehicle 12 occupants and host vehicle 12 operators. Additional sensors 14 may include, without limitation: inertial measurement units (IMUs) 16, suspension control units such as Semi Active Damping Suspension (SADS) sensors 18, global positioning system (GPS) 20 sensors 22, wheel speed sensors 24 capable of measuring rotational speeds of one or more wheels 26 of the host vehicle 12, throttle and/or accelerator pedal position sensors 28, brake pedal position sensors 30, steering position sensors 32 capable of measuring a steering system 34 position, steering rate, and steering velocity, tire pressure monitoring systems 36, and the like.

The IMUs 16 can measure host vehicle 12 movement, acceleration, and the like in several degrees of freedom. In a specific example, the IMUs 16 may measure position, movement, acceleration, etc. in at least three degrees of freedom. Likewise, the SADS sensors 18 may be IMUs 16 capable of measuring in three or more degrees of freedom. In some examples, the SADS 18 may be suspension hub accelerometers, or the like. The sensors 14 of the host vehicle 12 may therefore detect and record wheel speed data, host vehicle 12 position and location, host vehicle 12 static and dynamic state information such as velocity, acceleration, and the like.

As used herein, the terms "forward", "rear", "inner", "inwardly", "outer", "outwardly", "above", and "below" are terms used relative to the orientation of the host vehicle 12 as shown in the drawings of the present application. Thus, "forward" refers to a direction toward a front of a vehicle 12, "rearward" refers to a direction toward a rear of a vehicle 12, "inner" and "inwardly" refers to a direction towards an interior or passenger compartment 38 of a vehicle 12, and "outer" and "outwardly" refers to a direction towards the exterior of a vehicle 12, "below" refers to a direction towards the bottom of the host vehicle 12, and "above" refers to a direction towards a top of the host vehicle 12.

The system 10 further includes one or more controllers 40 in communication with the various sensors 14 of the host vehicle 12, processes information received therefrom, and generates output signals that are used to assist the vehicle operator 42 in maintaining attention and avoiding highway hypnosis or white line fever. The controllers 40 are integrated into the host vehicle 12. More specifically, the controllers 40 are non-generalized, electronic control devices having a preprogrammed digital computer or processor 44, non-transitory computer readable medium or memory 46 used to store data such as control logic, software applications, instructions, computer code, data lookup tables, etc., and input/output (I/O) ports 48. Computer readable medium or memory 46 includes any type of medium capable of being accessed by a computer, such as read only memory (ROM), random access memory (RAM), a hard disk drive, a compact disk (CD), a digital video disc (DVD), or any other type of memory. A "non-transitory" computer readable memory 46 excludes wired, wireless, optical, or other communication links that transport transitory electrical or other signals. A non-transitory computer readable memory 46 includes media where data can be permanently stored, and media where data can be stored and later overwritten, such as a rewritable optical disc or an erasable memory device. Computer code includes any type of program code, including source code, object code, and executable code. The processor 44 is configured to execute the code or instructions. The host vehicle 12 may have additional controllers 40 such as a dedicated Wi-Fi controller, an engine control module, a transmission control module, a body control module, an infotainment control module, or the like. The I/O ports 48 may be configured to communicate via wired communications, wirelessly via Wi-Fi protocols under IEEE 802.11x, or the like without departing from the scope or intent of the present disclosure.

The controller 40 further includes one or more applications 50. An application 50 is a software program configured to perform a specific function or set of functions. The application 50 may include one or more computer programs, software components, sets of instructions, procedures, functions, objects, classes, instances, related data, or portions thereof adapted for implementation in a suitable computer readable program code. The applications 50 may be stored within the memory 46 or in additional or separate memory 46. Examples of applications 50 include audio or video streaming services, games, browsers, social media, etc. In other examples, the applications 50 are used to manage host vehicle 12 body control system functions; suspension control system 54 functions; steering control system 56 functions; powertrain 58 control system functions, including transmission 59 and/or engine 60 control system functions; braking system 62 control functions; or the like in an exemplary vehicle 12. More specifically, the host vehicle 12 is equipped with a variety of control systems that manage static and dynamic host vehicle 12 performance characteristics via a plurality of onboard actuators 64 equipped to the host vehicle 12.

The actuators 64 may take any of a variety of different forms, and manage many distinct and/or interrelated host vehicle 12 control systems without departing from the scope or intent of the present disclosure. It will be appreciated that the actuators 64 may be electrically, hydraulically, pneumatically, mechanically, electromechanically, electrohydraulically, electropneumatically, magnetorheologically, hydropneumatically, electromagnetically, and/or any combination of the above types of actuatable devices that are used to alter one or more static and/or dynamic performance attributes of the host vehicle 12.

In some non-limiting examples, the suspension control system 54 includes one or more suspension system actuators 64 such as active or semi-active dampers 66 capable of altering a damping force transmitted from wheels 26 of the host vehicle 12 to a body 68 of the host vehicle 12 as the host vehicle 12 is driven on a road surface. The steering control system 56 actuators may include electric motors, electrohydraulic, electropneumatic, or other such motors or steering actuators 70 that apply torque to a steering shaft 72 or steering rack 74 of the host vehicle 12, and which thereby alter a direction of host vehicle 12 travel by altering a position or angular orientation of steerable wheels 26 of the host vehicle 12. By contrast, the onboard actuators 64 of the transmission 59 or engine 60 control system may include the transmission 59 or engine 60 themselves and/or actuating components therein which may alter a torque output or torque ratio of the engine 60 or transmission 59 or the like. In some non-limiting transmission 59 or engine 60 control system actuators 76 may include a throttle or e-throttle 78 capable of altering a torque output of the engine 60, a transmission actuator 80 capable of altering gear ratios and torque-outputs transmitted from the engine 60 through the transmission 59, and the like. It should further be appreciated that while the host vehicle 12 shown in FIG. 1 is equipped with an internal combustion engine (ICE) 60, that the engine 60 may be any type of engine 60 or prime mover, such as an ICE engine 60, an electric motor, a hybrid-electric engine 60, combinations thereof, or any other type of known engine 60 type without departing from the scope or intent of the present disclosure. Similarly, the braking system 62 actuators 64 include brakes 82 of the host vehicle 12 capable of selectively retarding a rotational speed of the wheels 26 of the host vehicle 12, and thereby altering a velocity of the host vehicle 12 itself.

The host vehicle 12 may be operated in any one of a variety of different modes, including a fully manual mode, in which the vehicle operator 42 has full control of host vehicle 12 static and dynamic performance characteristics. In other non-limiting examples, the host vehicle 12 may be operated in fully or semi-autonomous modes that control some or all of the static and dynamic performance of the host vehicle 12. More specifically, the system 10 of the present disclosure operates on a host vehicle 12 having advanced driver assistance systems (ADAS) 84 capable of controlling automatic cruise control (ACC) 11 functions, steering, braking, and any of a variety of other means of controlling onboard host vehicle 12 systems.

Figure 2:
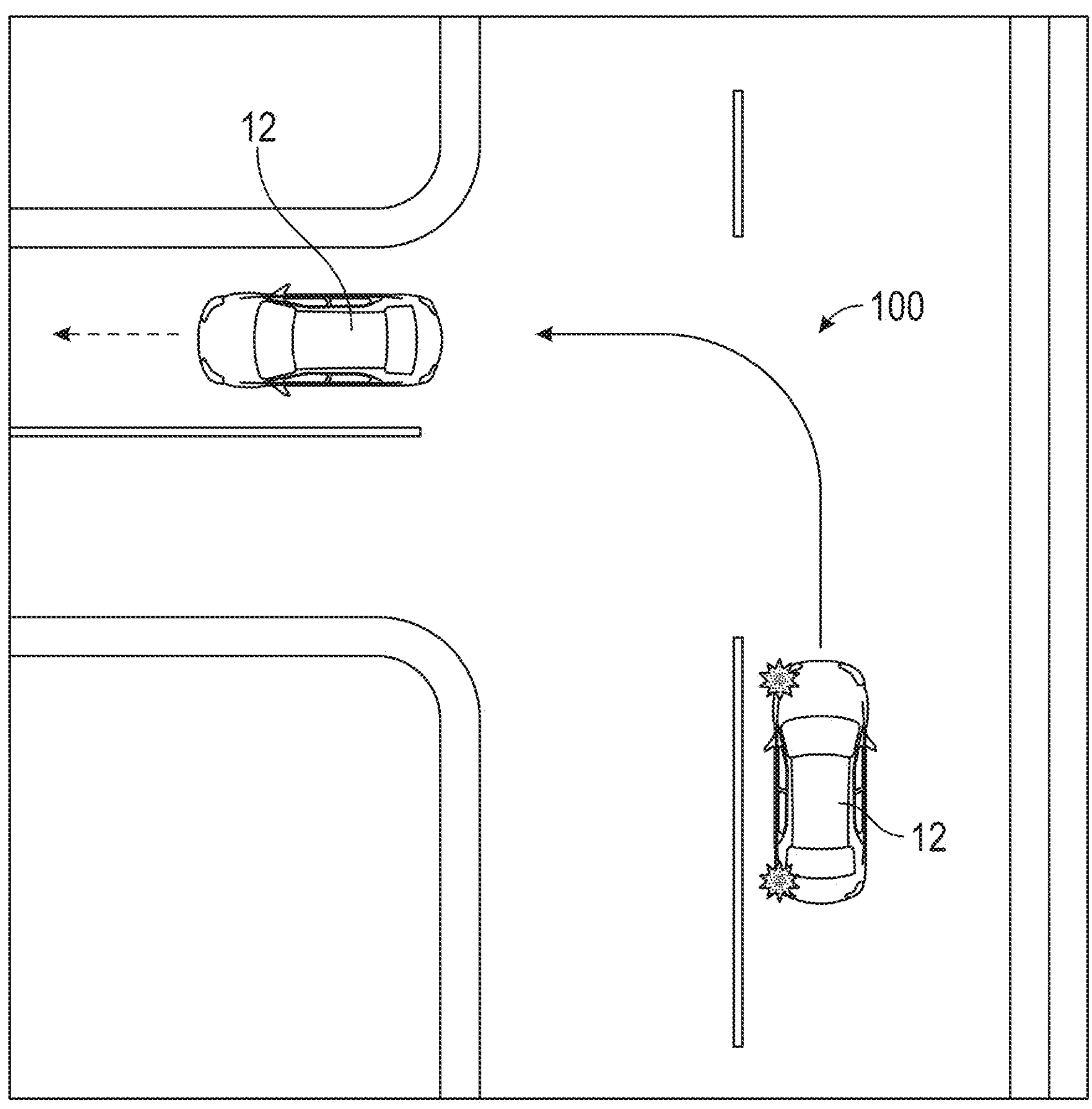
FIG. 2 is a perspective top view of a road intersection depicting a host vehicle navigating a turn utilizing the system of FIG. 1 according to an aspect of the present disclosure.
Figure 3:
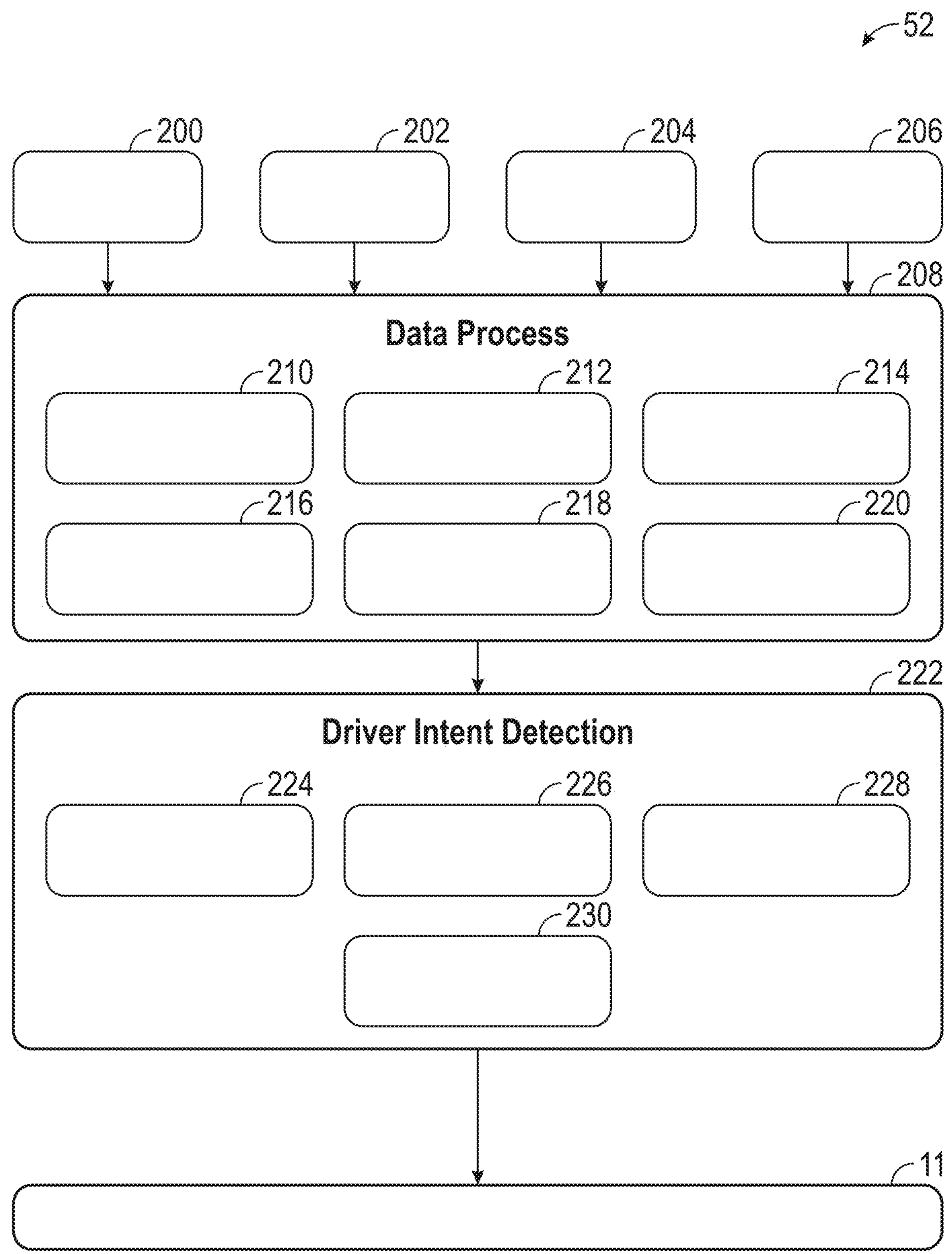
FIG. 3 is a flowchart depicting logical flow of a maneuver prediction speed profile adaptation (MPSPA) application of the system of FIG. 1 according to an aspect of the present disclosure.

Referring now to FIGS. 2 and 3 and with continuing reference to FIG. 1, the system 10 utilizes one or more applications 50, specifically a maneuver prediction speed profile adaptation (MPSPA) application 52 that utilizes sensor 14 data, vehicle operator 42 preference data, location data, and the like to adjust an ACC 11 speed profile of the host vehicle 12 while simultaneously allowing vehicle operators 42 to comfortably, and accurately execute course or directional changes via steering inputs without disengaging ACC.

The system 10 and MPSPA application 52 enhances ACC 11 control of the host vehicle 12 by incorporating maneuver prediction and speed profile adaptation. The system 10 and MPSPA application 52 operate akin to a shadow planner that predicts where the vehicle operator 42 wants to go and adapts the host vehicle's 12 speed profile to best match the vehicle operator's 42 intent. By analyzing vehicle operator 42 inputs and surrounding vehicles 12', and predicting the maneuvers of surrounding vehicles 12', the system 10 and MPSPA application 52 adaptively adjusts the speed profile of the ACC 11 to ensure efficient and comfortable operation of the host vehicle 12. In a non-limiting example, the host vehicle 12 may be slowing down while the vehicle operator 42 makes a left turn utilizing ACC. The system 10 and MPSPA application 52 improves accuracy and responsiveness of the ACC, leading to smoother and more intelligent driving experiences than systems 10 not so equipped. The system 10 and MPSPA application 52 enables ACC 11 while the host vehicle 12 is being operated actively in complex manual driving scenarios like taking turns, navigating through different paths, and the like.

In several aspects, the system 10 and MPSPA application 52 perform maneuver prediction in a mathematical process or derivation. To construct a probabilistic maneuver prediction, a probability function is utilized for each vehicle state variable expressed by following a sigmoid function. Current host vehicle 12 state variables include: host vehicle 12 speed, $v_x$, host vehicle 12 steering angle, $\delta$, torsion bar torque, $\tau$, and torsion bar torque rate, $\dot{\tau}$.

$$P_{M,x}(k) = \frac{1}{1 + e^{-\beta_{M,x}(|x| - \alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following.

The maneuver probability is obtained by multiplication of the state probability functions as follows:

$$P_M(k) = g_d \prod_{x=1}^{n} P_{M,x}(k) \quad \text{Eq. 2}$$

where $P_{M,x}$: is a probability function of variable x for maneuver M; k is a sampling time, $\beta_{M,x}$ is a tuning parameter, sigmoid steepness of variable x for maneuver M; $\alpha_{M,x}$ is a tuning parameter, sigmoid midpoint of variable x for maneuver M; n is a number or quantity of variables; and $g_d$ is a direction of the maneuver M such that for a right side maneuver is $g_d=-1$, and for a left side maneuver $g_d=1$.

The system 10 and MPSPA application 52 also integrate environmental knowledge to increase confidence levels of predictions generated by the system 10 and MPSPA application 52. Environmental knowledge is used in different categories, including but not limited to: road information, such as road type, number or quantity of lanes, construction zone presence/absence; surrounding object information, such as closest-in-vehicle-path (CIPV) turn signals; navigation information, such as a chosen navigation route, and the like. An effect of each category of environmental knowledge is represented by a gain, depending on the maneuver being undertaken by the host vehicle 12. Upon determining that some or all of the environmental knowledge is irrelevant to a specific maneuver, the gain is set to be equal to one (1), whereas when the environmental knowledge is relevant to the specific maneuver, the gain is greater than one based on a level of importance. For example, when a host vehicle 12 is driving on the a highway, a road information gain for turning is 1, but a road information gain for lane changes is greater than 1, as the probability of a lane change maneuver on the highway is higher than the probability of a turn. The multiplication of the gains forms a final environmental gain, which may be expressed as:

$$g_{M,e} = g_{M,r} \times g_{M,s} \times g_{M,n} \quad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M. The following equation expresses the maneuver probability function considering environmental knowledge:

$$P_M(k) = g_{M,e} \times g_d \prod_{x=1}^{n} P_{M,x}(k). \quad \text{Eq. 4}$$

To maintain vehicle operator 42 comfort and trust in the system 10 and MPSPA application 52, the system 10 and MPSPA application 52 actively adapt ACC 11 function though a driving style adaptation. The driving style adaptation may be considered a subroutine or algorithm of the MPSPA application 52. Within the driving style adaptation, the probability of each predicted maneuver, along with related host vehicle 12 state variables are stored in a buffer of size L over time. By taking an average and standard deviation of the buffered state variables from the initial turning parameters, $$\alpha_{M,x}^0 \text{ and } \beta_{M,x}^0,$$

tuning parameters $\alpha_{M,x}$ and $\beta_{M,x}$ are updated as follows:

$$\alpha_{M,x}^{d} = \alpha_{M,x}^{0} + \lambda_{M,x}^{\alpha}\Delta\alpha_{M,x}; \quad \text{Eq. 5}$$

$$\Delta\alpha_{M,x} = \frac{\sum_{j=1}^{L}\left(x(j) - \alpha_{M,x}^{0}\right)}{L}; \quad \text{Eq. 6}$$

$$\beta_{M,x}^{d} = \beta_{M,x}^{0} + \lambda_{M,x}^{\beta}\Delta\beta_{M,x}; \quad \text{Eq. 7}$$

$$\Delta\beta_{M,x} = K_{M,x}^{\beta}\sqrt{\frac{\sum_{j=1}^{L}\left(x(j) - \beta_{M,x}^{0}\right)^{2}}{L}}; \quad \text{Eq. 8}$$

$$\lambda_{M,x} = f\left(\frac{1}{P_M}\right); \quad \text{Eq. 9}$$

where $$K_{M,x}^{\beta}$$

defines a level of distribution, $$\lambda_{M,x}^{\alpha} \text{ and } \lambda_{M,x}^{\beta}$$

are learning rates. Finally, the system 10 and MPSPA application 52 adjusts turning parameters based on road curvature, ρ, bank, ϕ, grade, θ, and road friction, μ.

$$\alpha_{M,x} = f\left(\phi, \rho, \theta, \mu, \alpha_{M,x}^{d}\right); \quad \text{Eq. 10}$$

$$\beta_{M,x} = f\left(\phi, \rho, \theta, \mu, \beta_{M,x}^{d}\right). \quad \text{Eq. 11}$$

An ACC 11 update based on the maneuver prediction calculations above is then carried out such that a longitudinal control command (i.e. a command controlling longitudinal acceleration and/or deceleration of the host vehicle 12) may be expressed as:

$$[\Delta V_{x,ref}, \Delta a_{x,ref}]' = f(E, R, P_M, V, \tau, \ldots) \quad \text{Eq. 12}$$

In a more specific, but non-limiting embodiment, the longitudinal control command may be expressed as:

$$[\Delta V_{x,ref}, \Delta a_{x,ref}]' = (k_1 \cdot V \cdot k_2(R) \cdot (1 - k_3 \cdot E) + k_4 \cdot \tau) \cdot k_5(P_M); \quad \text{Eq. 13}$$

taking into account that host vehicle 12 velocity V; a current speed of the host vehicle 12 in m/s, a road type R, such as a highway, urban, rural, or the like; environmental complexity E; driving environment complexity (e.g., traffic density, weather); vehicle operator 42 torque (τ) is a torque applied by the vehicle operator 42 to the host vehicle 12 steering wheel (Nm); maneuver prediction ($P_M$) is a type of maneuver predicted (e.g., turn, lane change, U-turn), and the like. It will be appreciated that each maneuver type may influence the longitudinal control command differently. For example: turning: may require deceleration to maintain safety. Lane change: may necessitate a slight acceleration to merge safely. U-Turn: typically requires significant deceleration.

Longitudinal control command $[\Delta V_{x,ref}, \Delta a_{x,ref}]'$: desired acceleration or deceleration command (m/s²) and the derivative.

Design parameters and calibrations are for the factors above are described in additional detail as follows:

$k_1$ is a velocity scaling factor. The $k_1$ value is a constant that scales a base command based on the host vehicle's 12 speed. The $k_1$ velocity scaling factor determines how much acceleration or deceleration is applied relative to the current host vehicle 12 speed. Higher values of the $k_1$ velocity scaling factor increase responsiveness of the system 10 and MPSPA application 52 at higher speeds, while lower values of the $k_1$ velocity scaling factor make the system 10 and MPSPA application 52 more conservative, especially in urban settings.

$k_2$ is a road type adjustment factor. The $k_2$ road type adjustment factor adjusts the ACC 11 command based on the type of road. Different road types require different driving behaviors. In some non-limiting examples, where the host vehicle 12 is being driven on a highway, the $k_2$ road type adjustment factor is close one (e.g., 1.0), whereas during urban driving, the $k_2$ road type adjustment factor is less than one (e.g., 0.8), and when the host vehicle 12 is being driven on rural roads or in rural conditions, the $k_2$ road type adjustment factor is slightly greater than one (e.g., 1.1).

$k_3$ is an environmental complexity factor. The $k_3$ environmental complexity factor accounts for the complexity of the host vehicle's 12 driving environment, affecting how much the ACC 11 command is reduced in challenging conditions. In several non-limiting examples, higher $k_3$ environmental complexity factor values cause the system 10 and MPSPA application 52 to perform more cautious driving in complex environments (e.g., heavy traffic), while lower $k_3$ environmental complexity factor values allow the system 10 and MPSPA application 52 to perform more aggressive driving in simpler environments.

$k_4$ is a driver torque influence factor. The $k_4$ driver torque influence factor constant determines how much the vehicle operator's 42 steering input (torque) influences the longitudinal ACC 11 command. In some non-limiting examples, a higher $k_4$ driver torque influence factor values result in greater influence of vehicle operator 42 inputs on acceleration/deceleration of the host vehicle 12, whereas lower $k_4$ driver torque influence factor values result in increased levels of autonomous control, such that host vehicle 12 acceleration/deceleration is less influenced by vehicle operator 42 inputs.

$k_5(P_M)$ is the maneuver prediction adjustment factor. The $k_5$ ($P_M$) maneuver prediction adjustment factor modifies the command based on the predicted maneuver type (e.g., turn, lane change). In several non-limiting examples, turning: ($k_5$<1) (e.g., 0.7); lane change: ($k_5$~1) (e.g., 1.0); and a U-Turn has or is associated with a significant reduction in value (e.g., 0.5).

In FIG. 2, the system 10 and MPSPA application 52 are shown in additional detail in the context of a host vehicle 12 navigating a left-hand turn at an intersection 100. The host vehicle 12 is being operated with automatic cruise control (ACC) 11 enabled, and in order to comfortably navigate through the left-hand turn depicted in FIG. 2, the system 10 and MPSPA application 52 alter the host vehicle's 12 longitudinal velocity via application of host vehicle 12 brakes 82, engine 60, transmission 59, or other such powertrain 58 control system functions. In FIG. 3, at blocks 200, 202, 204, and 206 of FIG. 4, the system 10 and MPSPA application 52 utilize the sensors 14 of the host vehicle 12 to ascertain a current host vehicle 12 static and/or dynamic state of operation of the host vehicle 12. More specifically, the MPSPA application 52 and system 10 utilize one or more IMUs 16, one or more steering position or steering angle sensors (SAS) 32, and accelerator pedal position sensors 28 and brake pedal position sensors 30 to generate state information about the host vehicle 12. Subsequently, at block 208, the system 10 and MPSPA application 52 process the data from the sensors 14. To further refine the sensor 14 data, the system 10 and MPSPA application 52 may utilize camera sensors, vehicle operator 42 monitoring information, wheel 26 speed sensors, GPS sensor 20 data, and live traffic information.

Within block 208, the system 10 and MPSPA application 52 filter the sensor 14 data at block 210, perform feature extraction at block 212 based on the filtered data from block 210, and then synchronize the sensor 14 data at block 214. By filtering the data at block 210, the MPSPA application 52 and system 10 are able to reduce computational resource utilization from a first utilization level to a second utilization level less than the first by selecting only certain portions of the sensor 14 data that may indicate a host vehicle 12 or vehicle operator 42 state change or command. To further refine and selectively operate upon the sensor 14 data, the feature extraction at block 212 is applied to the filtered data from block 210, to determine whether a host vehicle 12 or vehicle operator 42 state change or command is of sufficient magnitude to call for additional processing. In some examples, features found in the feature extraction at block 212 may include lane changes, route-guidance based turns, highway merging, and the like. The synchronization of sensor 14 data ensures that data obtained from various sensors 14 of the host vehicle 12 is properly and accurately aligned and associated in time such that the sensor 14 data from each of the host vehicle 12 sensors 14 is correlated with and aligned in time with data obtained from the other sensors 14 of the host vehicle 12. The system 10 and MPSPA application 52 subsequently generate a probabilistic path prediction at block 216. As described previously, to generate the probabilistic path prediction, a probability function is used for each host vehicle 12 state variable expressed in the sigmoid function:

$$P_{M,x}(k) = \frac{1}{1 + e^{-\beta_{M,x}(|x| - \alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following, where the current host vehicle 12 state variables include: host vehicle 12 speed, $v_x$, host vehicle 12 steering angle, $\delta$, torsion bar torque, $\tau$, and torsion bar torque rate, $\dot{\tau}$.

At block 218, the system 10 and MPSPA application 52 normalizes the sensor 14 data to improve a quality, an integrity, a flexibility, a performance, and a usability of the sensor 14 data from a first level to a second level greater than the first level. Moreover, the normalization of the sensor 14 data reduces redundant information in the sensor 14 data from a first redundancy level to a second redundancy level less than the first redundancy level. At block 220, the system 10 and MPSPA application 52 perform a confidence calculation utilizing environmental knowledge in a variety of different categories, as previously described, where a confidence calculation output defines a likelihood that a particular type of maneuver M is being carried out by the host vehicle 12. Subsequently, from block 220 within block 208, the system 10 and MPSPA application 52 proceed to block 222 where the system 10 and MPSPA 52 perform vehicle operator 42 intent detection.

In several aspects, the vehicle operator 42 intent detection process utilizes a machine learning (ML) model 224 to classify vehicle operator 42 intent in a data driven classification process. More specifically, the system 10 and MSPA application 52 incorporate a shadow planner to enhance ACC 11 by predicting the vehicle operator's 42 intended path and adapting a speed profile of the host vehicle 12 to match the vehicle operator's 42 intent, based on an analysis of vehicle operator 42 inputs to host vehicle 12 control systems and behavior of surrounding vehicles 12'. At block 226, the system 10 and MPSPA application 52 perform real-time path classification to assess the type of maneuver that the vehicle operator 42 and/or ADAS 84 of the host vehicle 12 is actively pursuing. Different types of host vehicle 12 maneuvers are classified in a data-driven fashion, and may include real-time path classifications of "left turn", "right turn", and the like. The vehicle operator 42 intent may be expressed as one or more of a lateral command 300 and a longitudinal command 400, shown in additional detail in FIGS. 4A and 4B. The system 10 and MPSPA application 52 subsequently perform an enumeration calculation at block 228. The enumeration calculation at block 228 qualifies the classified real-time paths as defining a left turn, a right turn, or the like, and then at block 230, the system 10 and MPSPA application 52 generate a trajectory prediction based on the real-time paths, GPS data, and navigation information, such as a chosen navigation route, and the like. Outputs of the driver intent detection processes within block 222 are generated as changes in vehicle velocity $\Delta V_{x,ref}$, changes in vehicle acceleration $\Delta a_{x,ref}$, and the like, and sent to the ACC 11 to alter a host vehicle 12 velocity through activation and control of one or more actuators 64 of the transmission 59 and/or engine 60 control systems; braking control system 62, and the like.

Figure 4A:
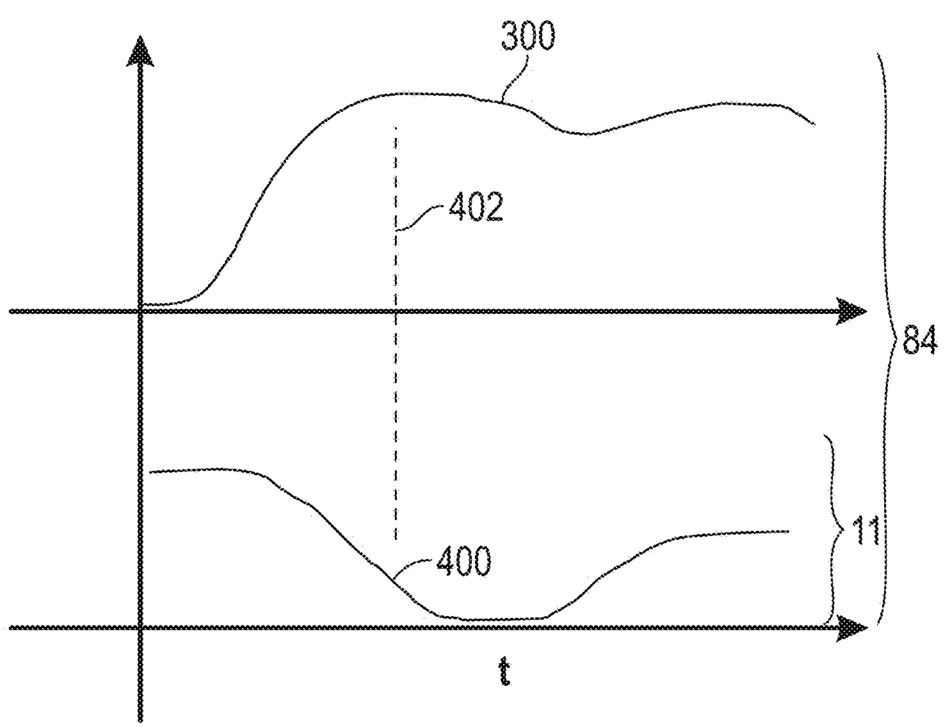
FIG. 4A is a first graphical representation of lateral and longitudinal commands to actuators of a host vehicle navigating a turn utilizing the MPSPA application of FIG. 3 according to an aspect of the present disclosure.
Figure 4B:
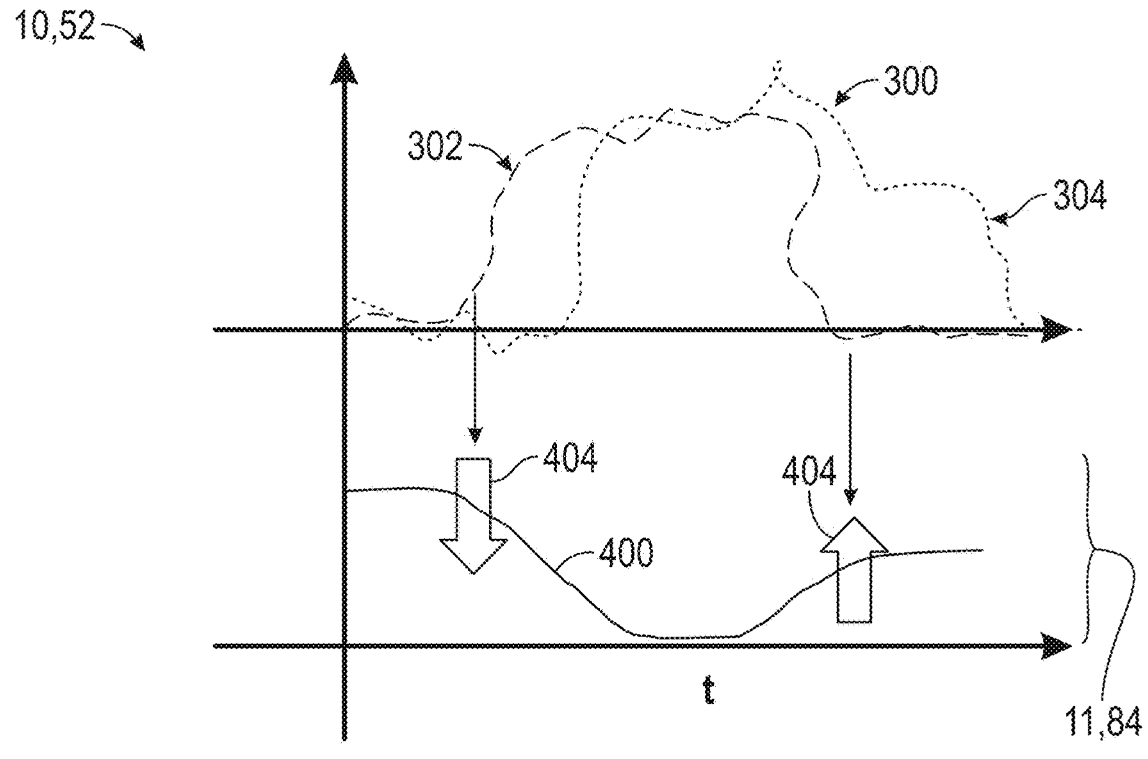
FIG. 4B is a second graphical representation of lateral and longitudinal commands to actuators of a host vehicle navigating a turn utilizing the MPSPA application of FIG. 3 according to another aspect of the present disclosure.

Turning now more specifically to FIGS. 4A and 4B, and with continued reference to FIGS. 1-3, graphical representations of system 10 and MPSPA application 52 operation during the exemplary turn depicted in FIG. 2 are shown in further detail. FIGS. 4A and 4B each depict lateral commands 300, and longitudinal commands 400. Lateral commands 300 are commands to the host vehicle 12 actuators 64 to alter a lateral trajectory of the host vehicle 12. That is, lateral commands 300 are commands that alter one or more of a torque output to the wheels 26 of the host vehicle 12 on opposite sides of the host vehicle 12 (i.e. left and right sides of the host vehicle 12) via application of differential torque to the wheels 26 of the host vehicle 12 by way of transmission 59 and/or engine 60 control system actuators 64, and/or braking control system 62 actuators 64 that result in rotation or yaw of the host vehicle 12. In additional non-limiting examples, the lateral commands 300 are inputs to or commands acting upon the steering system 34 via steering actuators 70 applying torque to a steering shaft 72 and/or steering rack 74 of the host vehicle 12, resulting in rotation or yaw of the host vehicle 12 in a lateral, rather than a longitudinal direction.

By contrast, the longitudinal commands 400 define system 10 and MPSPA application 52 commands to one or more of the transmission 59 and engine control systems, and more specifically to the engine control system actuators 76 and/or transmission actuators 80 to alter a torque output of the engine 60, transmission 59, thereby alter a host vehicle 12 speed, velocity and/or acceleration. Likewise, the longitudinal commands 400 may further include application of torque to the wheels 26 of the host vehicle 12 by way of transmission 59 and/or engine 60 control system actuators 64, and/or braking control system 62 actuators 64 thereby causing changes in rotational speed of the wheels 26, and resulting in changes in host vehicle 12 speed, velocity, and or/acceleration.

As shown in FIGS. 4A and 4B, lateral commands 300 and longitudinal commands 400 are shown with command magnitude depicted along the Y axis, and time along the X axis. Referring specifically to FIG. 4A, vertical dashed line 402 defines an event upon which the ADAS 84 and specifically, the ACC 11 of the host vehicle 12 act to adjust a speed of the host vehicle 12. More specifically, the event may be a turn, or the like, such as that depicted in FIG. 2. It will be appreciated that in a completely manually-driven vehicle 12, upon initiating a turn in a vehicle 12, the vehicle operator 42 adjusts a longitudinal velocity of the host vehicle 12 to a desired velocity from a prior cruising velocity, where the cruising velocity of the host vehicle 12 is greater than the desired velocity of the host vehicle 12. Upon achieving the desired velocity, the vehicle operator 42 then initiates the turn by engaging or otherwise generating input commands acting upon the steering system 34 via steering actuators 70 applying torque to a steering shaft 72 and/or steering rack 74 of the host vehicle 12, resulting in rotation or yaw of the host vehicle 12, thereby directing the host vehicle 12 through the turn. Upon completion of the turn, or upon completing a sufficient amount of the turn to where the steering inputs can be bled off, or otherwise decreased so that the host vehicle's 12 wheels 26 are once again approaching straight ahead, and in the host vehicle's 12 direction of travel, the vehicle operator 42 applies throttle inputs to re-accelerate the host vehicle 12 to the cruising velocity. FIG. 4A depicts a host vehicle 12 being driven in a largely autonomous mode, such as a level 2 autonomous driving mode in which the ADAS 84 applies lateral and longitudinal inputs to the actuators 64 of the host vehicle 12 to cause the host vehicle 12 to navigate the turn shown in FIG. 2.

By contrast, as shown in FIG. 4B, the system 10 and MPSPA application 52 monitor host vehicle 12 sensors 14 and actuators 64 both while the host vehicle 12 is operated manually, and while the host vehicle 12 is being operated autonomously or semi-autonomously by ADAS and ACC. Over time, the MPSPA application 52 and system 10 are thereby trained to recognize situations in which turns are initiated, and adaptively adjusts 404 longitudinal inputs and lateral inputs to achieve lateral and longitudinal velocity, yaw, and vehicle operator 42 observed forces that align with each vehicle operator's 42 historical preferences. That is, in some examples, the sensors 14 of the host vehicle 12 detect information about each vehicle operator 42, and store the vehicle operator 42 information within the memory 46 of the controllers 40 of the host vehicle 12 as vehicle operator 42 preferences. The vehicle operator 42 information may include information about each vehicle operator's 42 typical driving styles, methods of operating the host vehicle 12. From the vehicle operator 42 preferences, the system 10 and MPSPA application 52, generate a predicted maneuver including a predicted lateral command 302, and the predicted longitudinal command 400. In several aspects, the predicted lateral command 302 defines a system 10 and MPSPA application 52 output command to alter lateral motion of the host vehicle 12 in a way that approximates or mimics vehicle operator 42 applied lateral commands 304 stored in memory 46. In some non-limiting examples, the vehicle operator 42 preferences may be stored in host vehicle 12 controller 40 memory 46 on a per-vehicle operator 42 basis, or per vehicle operator 42 identifier. That is, each individual vehicle operator 42 may log into or otherwise indicate their presence within the host vehicle 12, at which point, the system 10 and MPSPA application 52 call upon vehicle operator 42 preferences in memory 46 that correspond to the currently logged-in vehicle operator 42, and adjust host vehicle 12 ACC 11 and ADAS functions and operations according to the currently logged-in vehicle operator's 42 stored preferences.

In additional non-limiting examples, the vehicle operator 42 preferences, including vehicle operator 42 lateral commands 304 are stored in memory 46 locally within the controllers 40 of the host vehicle 12 as well as in additional or auxiliary memories 46 of controllers 40 separate from and located remotely from the host vehicle 12. That is, vehicle operator 42 lateral commands are stored in additional or auxiliary memories 46 of controllers 40 located remotely from the host vehicle 12 as well. Such remote controllers 40 may, in some non-limiting examples, be located in or on cloud computing servers 406, satellite-based servers, and/or in any other location in electronic wireless communication with controllers 40 of the host vehicle 12 without departing from the scope or intent of the present disclosure.

In several aspects, the system 10 and MPSPA application 52 of the present disclosure may operate on vehicles 12 with level 1 and/or level 2 autonomy capabilities. That is, the host vehicle 12 may be equipped with systems that offer vehicle operator 42 assistance with steering, braking, and/or acceleration in predefined situations. Such level 1 autonomy may include, for example: adaptive cruise control (ACC) 11 which maintains a safe distance from a surrounding vehicle 12' in front of the host vehicle 12 by controlling acceleration and braking of the host vehicle 12; automated lane keeping which helps to keep the host vehicle 12 in a current lane by detecting lateral movement of the host vehicle 12 in the lane and altering steering position to correct for such movement; and/or park assistance, which may assist in reverse parking the host vehicle 12 without vehicle operator 42 input. By contrast, level 2 autonomy provides partial vehicle operator 42 assistance by providing some steering, acceleration and/or braking control through use of ACC, lane-keeping assist (LKA) which provides gentle steering inputs to help keep the host vehicle 12 in a current lane; automated parking assistance for parallel or perpendicular parking via steering and/or brake and acceleration control; and traffic jam assistance, which assists the host vehicle 12 in maintaining a set speed and following a host vehicle 12 ahead in slow-moving traffic. In a non-limiting example, the system 10 and MPSPA application 52 of the present disclosure utilizes mission or route planning information to adaptively control longitudinal commands 400 via ACC 11 in a level 1 autonomy vehicle 12. By contrast, in a level 2 autonomy vehicle 12, the system 10 and MPSPA application 52 of the present disclosure adaptively control at least the longitudinal commands 400 via ACC, and in some cases also the lateral commands 300.

A system 10 and MPSPA application 52 of the present disclosure offer several advantages. These include the ability to utilize ADAS-based ACC 11 that incorporates maneuver prediction and speed adaptation to ensure that vehicle performance using ADAS and ACC 11 adaptively adjusts to vehicle operator or driver input preferences, thereby increasing vehicle operator comfort, while maintaining ADAS and ACC 11 efficiency, improving accuracy and responsiveness of the ACC, leading to smoother and more intelligent driving experiences while maintaining or decreasing system 10 complexity, and increasing 10 redundancy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for maneuver prediction based speed profile adaptation for behavior based automated cruise control in a host vehicle comprises:

a host vehicle;

one or more sensors, the one or more sensors detecting static and dynamic state information about the host vehicle;

one or more actuators, the one or more actuators altering static and dynamic performance of the host vehicle;

a controller having a processor, a non-transitory memory, and input/output (I/O) ports, the I/O ports in communication with the one or more sensors and the one or more actuators, the processor executing program code portions stored in the non-transitory memory, the program code portions including a maneuver prediction speed profile adaptation (MPSPA) application comprising:

a first control logic for capturing static and dynamic information about the host vehicle and about an environment surrounding the host vehicle;

a second control logic for processing the static and dynamic information about the host vehicle and about the environment surrounding the host vehicle, wherein the processing includes at least: feature extraction, synchronization, normalization, and generating a probabilistic path prediction; wherein the second control logic further comprises:

control logic for filtering and performing feature extraction on data from the one or more sensors;

wherein filtering causes the system and MPSPA application to reduce computational resource utilization from a first level to a second level less than the first by selecting only certain portions of the data from the one or more sensors that may indicate a host vehicle state change, and wherein the feature extraction further determines that the host vehicle state change is of a magnitude calling for additional processing;

control logic for synchronizing the data from the one or more sensors, wherein synchronizing the data causes the data from the one or more sensors to be accurately aligned and associated in time, so that data from each of the one or more sensors is correlated in time with data from each of the other sensors of the one or more sensors;

control logic for generating a probabilistic path prediction utilizing a probability function for each state variable, following a sigmoid function where:

host vehicle state variables include: host vehicle speed, $v_x$, host vehicle steering angle, $\delta$, torsion bar torque, $\tau$, and torsion bar torque rate, $\dot{\tau}$:

$$P_{M,x}(k) = \frac{1}{1 + e^{-\beta_{M,x}(|x| - \alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following, and wherein a maneuver probability is obtained by multiplication of state probability functions as follows:

$$P_M(k) = g_d \prod_{x=1}^{n} [\![P_{M,x}(k)]\!]) \quad \text{Eq. 2}$$

where $P_{M,x}$: is a probability function of variable x for maneuver M; k is a sampling time, $\beta_{M,x}$ is a tuning parameter, sigmoid steepness of variable x for maneuver M; $\alpha_{M,x}$ is a tuning parameter, sigmoid midpoint of variable x for maneuver M; n is a number or quantity of variables; and $g_d$ is a direction of the maneuver M such that for a right side maneuver is $g_d=-1$, and for a left side maneuver $g_d=1$;

a third control logic for detecting an intent of a vehicle operator; and a fourth control logic for generating a control command to the one or more actuators, wherein the control command selectively alters at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

2. The system of claim 1, wherein the first control logic further comprises:

control logic for obtaining host vehicle position, movement, and acceleration information in at least three degrees of freedom from an inertial measurement unit (IMU);

control logic for obtaining a host vehicle steering angle from one or more steering angle sensors (SAS);

control logic for obtaining an accelerator pedal position from an accelerator pedal position sensor; and control logic for obtaining a brake pedal position from a brake pedal position sensor.

3. The system of claim 1, further comprising:

control logic for integrating environmental knowledge in environmental knowledge categories including: road information, road type, a number or quantity of lanes, construction zone presence/absence, surrounding object information, closest-in-vehicle path (CIPV) turn signals, and navigation information, wherein an effect of each environmental knowledge category is represented by a gain where a multiplication of all environmental knowledge category gains defines a final environmental gain, which is expressed as:

$$g_{M,e} = g_{M,r} \times g_{M,s} \times g_{M,n} \quad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M, and wherein the following equation expresses a maneuver probability function considering environmental knowledge:

$$P_M(k) = g_{M,e} \times g_d \prod_{x=1}^{n} [\![P_{M,x}(k)]\!]. \quad \text{Eq. 4}$$

4. The system of claim 3, wherein the second control logic further comprises:

control logic for normalizing the sensor data, wherein normalizing the sensor data reduces redundant information in sensor data from a first redundancy level to a second redundancy level less than the first redundancy level; and control logic for generating a confidence calculation, wherein an output of the confidence calculation defines a likelihood that a particular type of maneuver M is being carried out by the host vehicle.

5. The system of claim 1, wherein the third control logic further comprises:

control logic for utilizing a data driven classification machine-learning (ML) model to incorporate a shadow planner that enhances adaptive cruise control (ACC) by predicting the vehicle operator's intended path and adapting a speed profile of the host vehicle to match the vehicle operator's intent based on an analysis of vehicle operator inputs to host vehicle control systems and behavior of surrounding vehicles;

control logic for performing real-time path classification to assess the type of maneuver that the vehicle operator and ADAS of the host vehicle are actively pursuing; and control logic for performing an enumeration calculation that qualifies classified real-time paths as defining at least one of: a left turn and a right turn.

6. The system of claim 3, wherein the third control logic further comprises:

control logic for generating a trajectory prediction based on real-time paths, global positioning system (GPS) data and navigation information, including a chosen navigation route.

7. The system of claim 6, wherein the fourth control logic further comprises:

control logic for generating a control command to the one or more actuators, wherein the control command includes a predicted lateral command and a predicted longitudinal command; and control logic for activating and controlling one or more actuators of a host vehicle transmission control system, engine control system, and braking control system to alter at least a longitudinal velocity of the host vehicle while a current classified real-time path maneuver M is being carried out in accordance with the predicted lateral command and the predicted longitudinal command.

8. A method for maneuver prediction based speed profile adaptation for behavior based automated cruise control in a host vehicle comprises:

detecting static and dynamic state information about a host vehicle with one or more sensors of the host vehicle;

altering static and dynamic performance of the host vehicle with one or more actuators of the host vehicle;

executing, by a processor of a controller of the host vehicle, program code portions stored in non-transitory memory of the controller, the controller further including input/output (I/O) ports in communication with the one or more sensors and the one or more actuators, the program code portions including a maneuver prediction speed profile adaptation (MPSPA) application comprising:

capturing static and dynamic information about the host vehicle and about an environment surrounding the host vehicle;

processing the static and dynamic information about the host vehicle and about the environment surrounding the host vehicle, wherein the processing includes at least: feature extraction, synchronization, normalization, and generating a probabilistic path prediction;

filtering and performing feature extraction on data from the one or more sensors, wherein filtering causes the method and MPSPA application to reduce computational resource utilization from a first level to a second level less than the first by selecting only certain portions of the data from the one or more sensors that may indicate a host vehicle state change, and wherein the feature extraction further determines that the host vehicle state change is of a magnitude calling for additional processing;

filtering and performing feature extraction on data from the one or more sensors, wherein filtering causes the method and MPSPA application to reduce computational resource utilization from a first level to a second level less than the first by selecting only certain portions of the data from the one or more sensors that may indicate a host vehicle state change, and wherein the feature extraction further determines that the host vehicle state change is of a magnitude calling for additional processing; synchronizing the data from the one or more sensors, wherein synchronizing the data causes the data from the one or more sensors to be accurately aligned and associated in time, so that data from each of the one or more sensors is correlated in time with data from each of the other sensors of the one or more sensors;

generating a probabilistic path prediction utilizing a probability function for each state variable, following a sigmoid function where:

host vehicle state variables include: host vehicle speed, $v_x$, host vehicle steering angle, $\delta$, torsion bar torque, $\tau$, and torsion bar torque rate, $\dot{\tau}$:

$$P_{M,x}(k) = \frac{1}{1 + e^{-\beta_{M,x}(|x| - \backslash\alpha_{M,x})}} \quad \text{Eq. 1}$$

where x is a variable, $v_x$, $\delta$, t, $\dot{\tau}$, and M is maneuver type including turn, lane change, u-turn, evasive steering, and/or lane following, and wherein a maneuver probability is obtained by multiplication of state probability functions as follows:

$$P_M(k) = g_d \prod_{x=1}^{n} [\![ P_{M,x}(k) ]\!]) \quad \text{Eq. 2}$$

where $P_{M,x}$: is a probability function of variable x for maneuver M; k is a sampling time, $\beta_{M,\,x}$ is a tuning parameter, sigmoid steepness of variable x for maneuver M; $\alpha_{M,\,x}$ is a tuning parameter, sigmoid midpoint of variable x for maneuver M; n is a number or quantity of variables; and $g_d$ is a direction of the maneuver M such that for a right side maneuver is $g_d=-1$, and for a left side maneuver $g_d=1$;

detecting an intent of a vehicle operator; and generating a control command to the one or more actuators, wherein the control command selectively alters at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

9. The method of claim 8, further comprising:

obtaining host vehicle position, movement, and acceleration information in at least three degrees of freedom from an inertial measurement unit (IMU);

obtaining a host vehicle steering angle from one or more steering angle sensors (SAS);

obtaining an accelerator pedal position from an accelerator pedal position sensor; and obtaining a brake pedal position from a brake pedal position sensor.

10. The method of claim 8, further comprising:

integrating environmental knowledge in environmental knowledge categories including: road information, road type, a number or quantity of lanes, construction zone presence/absence, surrounding object information, closest-in-vehicle path (CIPV) turn signals, and navigation information, wherein an effect of each environmental knowledge category is represented by a gain where a multiplication of all environmental knowledge category gains defines a final environmental gain, which is expressed as:

$$g_{M,e} = g_{M,r} \times g_{M,s} \times g_{M,n} \qquad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M, and wherein the following equation expresses a maneuver probability function considering environmental knowledge:

$$P_M(k) = g_{M,e} \times g_d \prod_{x=1}^{n} [\![ P_{M,x}(k ]\!]). \qquad \text{Eq. 4}$$

11. The method of claim 10, further comprising:

normalizing the sensor data, wherein normalizing the sensor data reduces redundant information in sensor data from a first redundancy level to a second redundancy level less than the first redundancy level; and generating a confidence calculation, and wherein an output of the confidence calculation defines a likelihood that a particular type of maneuver M is being carried out by the host vehicle.

12. The method of claim 8, further comprising:

utilizing a data driven classification machine-learning (ML) model to incorporate a shadow planner that enhances adaptive cruise control (ACC) by predicting the vehicle operator's intended path and adapting a speed profile of the host vehicle to match the vehicle operator's intent based on an analysis of vehicle operator inputs to host vehicle control methods and behavior of surrounding vehicles;

performing real-time path classification to assess the type of maneuver that the vehicle operator and ADAS of the host vehicle are actively pursuing; and performing an enumeration calculation that qualifies classified real-time paths as defining at least one of: a left turn and a right turn.

13. The method of claim 10, further comprising:

generating a trajectory prediction based on real-time paths, global positioning method (GPS) data and navigation information, including a chosen navigation route;

generating a control command to the one or more actuators, wherein the control command includes a predicted lateral command and a predicted longitudinal command; and activating and controlling one or more actuators of a host vehicle transmission control system, engine control system, and braking control system to alter at least a longitudinal velocity of the host vehicle while a current classified real-time path maneuver M is being carried out in accordance with the predicted lateral command and the predicted longitudinal command.

14. A method for maneuver prediction based speed profile adaptation for behavior based automated cruise control in a host vehicle comprises:

detecting static and dynamic state information about a host vehicle with one or more sensors of the host vehicle;

altering static and dynamic performance of the host vehicle with one or more actuators of the host vehicle;

executing, by a processor of a controller of the host vehicle, program code portions stored in non-transitory memory of the controller, the controller further including input/output (I/O) ports in communication with the one or more sensors and the one or more actuators, the program code portions including a maneuver prediction speed profile adaptation (MPSPA) application comprising:

capturing static and dynamic information about the host vehicle and about an environment surrounding the host vehicle, including:

obtaining host vehicle position, movement, and acceleration information in at least three degrees of freedom from an inertial measurement unit (IMU);

obtaining a host vehicle steering angle from one or more steering angle sensors (SAS);

obtaining an accelerator pedal position from an accelerator pedal position sensor; and obtaining a brake pedal position from a brake pedal position sensor;

processing the static and dynamic information about the host vehicle and about the environment surrounding the host vehicle, wherein the processing includes at least: feature extraction, synchronization, normalization, and generating a probabilistic path prediction, including:

filtering and performing feature extraction on data from the one or more sensors, wherein filtering causes the method and MPSPA application to reduce computational resource utilization from a first level to a second level less than the first by selecting only certain portions of the data from the one or more sensors that may indicate a host vehicle state change, and wherein the feature extraction further determines that the host vehicle state change is of a magnitude calling for additional processing;

synchronizing the data from the one or more sensors, wherein synchronizing the data causes the data from the one or more sensors to be accurately aligned and associated in time, so that data from each of the one or more sensors is correlated in time with data from each of the other sensors of the one or more sensors;

generating a probabilistic path prediction utilizing a probability function for each state variable, following a sigmoid function where:

host vehicle state variables include: host vehicle speed, $v_x$, host vehicle steering angle, $\delta$, torsion bar torque, $\tau$, and torsion bar torque rate, $\dot{\tau}$:

$$P_{M,x}(k) = \frac{1}{1 + e^{-\beta_{M,x}(|x| - \backslash \alpha_{M,x})}} \quad \text{Eq. 1}$$

where x is a variable, $v_x$, $\delta$, $\tau$, $\dot{\tau}$, and M is maneuver type including turn, lane change, u-turn, evasive steering, and/or lane following, and wherein a maneuver probability is obtained by multiplication of state probability functions as follows:

$$P_M(k) = g_d \prod_{x=1}^{n} [\![P_{M,x}(k)]\!]) \quad \text{Eq. 2}$$

where $P_{M,x}$: is a probability function of variable x for maneuver M; k is a sampling time, $\beta_{M,x}$ is a tuning parameter, sigmoid steepness of variable x for maneuver M; $\alpha_{M,x}$ is a tuning parameter, sigmoid midpoint of variable x for maneuver M; n is a number or quantity of variables; and $g_d$ is a direction of the maneuver M such that for a right side maneuver is $g_d=-1$, and for a left side maneuver $g_d=1$;

integrating environmental knowledge in environmental knowledge categories including: road information, road type, a number or quantity of lanes, construction zone presence/absence, surrounding object information, closest-in-vehicle path (CIPV) turn signals, and navigation information, wherein an effect of each environmental knowledge category is represented by a gain where a multiplication of all environmental knowledge category gains defines a final environmental gain, which is expressed as:

$$g_{M,e} = g_{M,r} \times g_{M,s} \times g_{M,n} \quad \text{Eq. 3}$$

where $g_{M,r}$ is a probability gain of road information for maneuver M; $g_{M,s}$ is a probability gain of surrounding objects for maneuver M; $g_{M,n}$ is a probability gain of navigation information for maneuver M; and $g_{M,e}$ is a probability gain of environmental knowledge for maneuver M, and wherein the following equation expresses a maneuver probability function considering environmental knowledge:

$$P_M(k) = g_{M,e} \times g_d \prod_{x=1}^{n} [\![P_{M,x}(k)]\!]) \quad \text{Eq. 4}$$

normalizing the sensor data, wherein normalizing the sensor data reduces redundant information in sensor data from a first redundancy level to a second redundancy level less than the first redundancy level;

generating a confidence calculation, and wherein an output of the confidence calculation defines a likelihood that a particular type of maneuver M is being carried out by the host vehicle;

detecting an intent of a vehicle operator, including:

utilizing a data driven classification machine-learning (ML) model to incorporate a shadow planner that enhances adaptive cruise control (ACC) by predicting the vehicle operator's intended path and adapting a speed profile of the host vehicle to match the vehicle operator's intent based on an analysis of vehicle operator inputs to host vehicle control methods and behavior of surrounding vehicles;

performing real-time path classification to assess the type of maneuver that the vehicle operator and ADAS of the host vehicle are actively pursuing; and performing an enumeration calculation that qualifies classified real-time paths as defining at least one of: a left turn and a right turn;

generating a trajectory prediction based on the real-time paths, global positioning method (GPS) data and navigation information, including a chosen navigation route; and generating a control command to the one or more actuators, wherein the control command includes a predicted lateral command and a predicted longitudinal command, and activating and controlling one or more actuators of a host vehicle transmission control system, engine control system, and braking control system to alter at least a longitudinal velocity of the host vehicle while a current classified real-time path maneuver M is being carried out in accordance with the predicted lateral command and the predicted longitudinal command, wherein the control command selectively alters at least a longitudinal velocity of the host vehicle to approximate vehicle operator historical preferences for lateral and longitudinal velocities, yaw and vehicle operator observed forces while the host vehicle is being driven in a fully autonomous and/or a semi-autonomous mode.

* * * * *